United States Patent
Morikawa et al.

(10) Patent No.: US 7,069,944 B2
(45) Date of Patent: Jul. 4, 2006

(54) FLOW RATE CONTROL DEVICE

(75) Inventors: Fumio Morikawa, Ibaraki-ken (JP); Hiroshi Kondou, Ibaraki-ken (JP)

(73) Assignee: SMC Corporation, Tokyo (JP)

( * ) Notice: Subject to any disclaimer, the term of this patent is extended or adjusted under 35 U.S.C. 154(b) by 296 days.

(21) Appl. No.: 10/783,636

(22) Filed: Feb. 20, 2004

(65) Prior Publication Data

US 2004/0226615 A1  Nov. 18, 2004

(30) Foreign Application Priority Data

Feb. 24, 2003  (JP) .............................. 2003-045835

(51) Int. Cl.
  *G05D 7/06* (2006.01)

(52) U.S. Cl. ................... 137/487.5; 137/486; 137/613; 700/19; 700/282

(58) Field of Classification Search ................ 137/486, 137/487.5, 613; 700/19, 282
See application file for complete search history.

(56) References Cited

U.S. PATENT DOCUMENTS 6,138,708 A * 10/2000 Waldbusser ................. 137/341

FOREIGN PATENT DOCUMENTS

| EP | 1 460 505 A2 * | 9/2004 |
| JP | 06324747 A * | 11/1994 |
| JP | 07-124460 | 5/1995 |
| JP | 09-303609 | 11/1997 |
| JP | 10-161751 | 6/1998 |

* cited by examiner

*Primary Examiner*—Ramesh Krishnamurthy
(74) *Attorney, Agent, or Firm*—Peter Ganjian

(57) ABSTRACT

To control a flow rate ranging from an extremely-low rate to a high rate, particularly, to control an extremely-low flow rate accurately, the following processes are executed. A regulator, a flow rate adjustment valve connected in series downstream of the regulator and adjusting a valve opening of its valve provided to a passage, and a flow rate sensor are provided. A regulator controlled degree and a valve opening controlled degree of the flow rate adjustment are found in accordance with a detection value and a target flow rate value to control the flow rate.

4 Claims, 8 Drawing Sheets

FLOW RATE CONTROL DEVICE

BACKGROUND OF THE PRESENT INVENTION

1. Field of the Invention

The present invention relates to a flow rate control device for controlling a flow rate of a liquid, particularly, to a flow rate control device for controlling a flow rate ranging from a small rate to a large rate.

2. Description of the Related Art

Generally, a flow rate of a liquid is determined by a valve opening (a cross section of an opening) of a valve and by a pressure differential across the valve. There are two types of device for controlling the flow rate of the liquid. One changes the valve opening, and another changes the pressure.

A curved line 100 shown in FIG. 9 represents a change of the flow rate when the valve opening is changed in the state that the pressure is relatively high. A curved line 102 represents a change of the flow rate when the valve opening is changed in the state that the pressure is relatively low. A curved line 104 represents a change of the flow rate when the pressure is changed in the state that the valve opening is relatively great. A curved line 106 represents a change of the flow rate when the pressure is changed in the state that the valve opening is relatively small. When the pressure is changed to change the flow rate, the flow rate is proportional to the square root of the pressure.

By changing the valve opening, a relatively wide-ranging flow rate can be controlled, as shown in the curved lines 100 and 102. However, in this case, the change of the flow rate reflects directly the change of the valve opening. In the extremely-low flow rate range, the flow rate is greatly changed in response to a small change of the valve opening, and thus not controlled accurately. Additionally, disturbance of the pressure change also influences the change of the flow rate.

When the pressure is changed, the valve opening is set small to stabilize the flow rate. For example, the flow rate is controlled along the curved line 106. In this case, because the flow rate changes small in response to the change of the pressure, stability of the flow rate is increased. On the other hand, because a range of the controllable flow rate is narrow, a high flow rate cannot be controlled.

A device for stably controlling a flow rate in response to a temperature change (for example, see a patent document 1), a device for reducing influence of a flow rate change caused by a change of upstream pressure (for example, see a patent document 2), and a device for controlling flow rates of more than two liquids and for mixing the liquids (for example, see a patent document 3) are suggested as the flow rate control device for controlling a flow rate of a liquid.

[Patent Document 1]
JP-A No.124460/1995
[Patent Document 2]
JP-A No. 303609/1997
[Patent Document 3]
JP-A No. 161751/1998

In principle, the devices suggested in the patent documents 1 to 3 control a flow rate by changing a valve opening, and thus the flow rate is instable due to disturbance such as a pressure change. Additionally, to control an extremely-low flow rate, the valve opening needs to become extremely small, and to be changed by an extremely-small degree. Therefore, the mechanical structure becomes complicated, and an accuracy, high cost motor is required.

Recently, a chemical liquid used in, e.g., semiconductor equipment is required to be supplied appropriately at an extremely-low flow rate to save an amount of the liquid. In this case, the flow rate is required to be accurately controlled in the state that the flow rate is extremely low. On the other hand, because a flow rate of pure water used for dilution and mixture of the chemical liquid is high, it is preferable that such a high flow rate is controllable.

In mixing the chemical liquid and pure water, a difference between pressures of the chemical liquid and pure water could cause the flow rate to be instable. In other words, when a pressure upstream of the flow of the chemical liquid is set low to make the flow rate low, a back pressure could cause the flow rate to be instable in mixing the chemical liquid and the pure water having a high flow rate.

Further, e.g., pressure pulsation by a pump supplying the chemical liquid is a factor of disturbance in the flow rate control.

SUMMARY OF THE INVENTION

For solving the above-described problems, an object of the present invention is to provide a flow rate control device which is applicable to a flow ranging from an extremely-low rate to a high rate and accurately controls even the extremely-low flow rate.

A flow rate control device of the present invention includes a regulator for reducing a pressure of a supplied liquid, a flow rate adjustment valve connected in series downstream of the regulator and adjusting a valve opening of its valve provided to a passage, a flow rate sensor for detecting a flow rate of the liquid, and a control portion for controlling the regulator by finding a regulator controlled degree in accordance with a detection value of the flow rate sensor and a target flow rate value and for controlling the flow rate adjustment valve by finding a valve opening controlled degree of the flow rate adjustment valve.

In such a manner, by controlling the regulator and flow rate adjustment valve connected in series to each another, flows ranging from an extremely-low rate to a high rate become controllable, and even the extremely-low flow rate can be accurately controlled.

In this case, the control portion finds the regulator controlled degree so that a difference between the detection value of the flow rate sensor and the target flow rate value becomes zero. When the regulator controlled degree is over a predetermined threshold, the valve opening may be increased.

Additionally, when the target flow rate value is over a flow rate corresponding to a predetermined control switching point, the valve opening is increased/decreased to control the flow rate while keeping a setting of the regulator almost constant. As a result, the flow rate can be controlled through a simple procedure, and even when the flow rate is extremely low, it can be accurately controlled.

Further, the flow rate sensor, when provided upstream of the regulator, can measure a flow rate without influence of bubbles generated by the regulator and flow rate adjustment valve.

DETAILED DESCRIPTION OF THE PREFERRED EMBODIMENTS

In the following, preferred embodiments of a flow rate control device of the present invention is explained with reference to the appended FIGS. 1 to 8.

Figure 1:
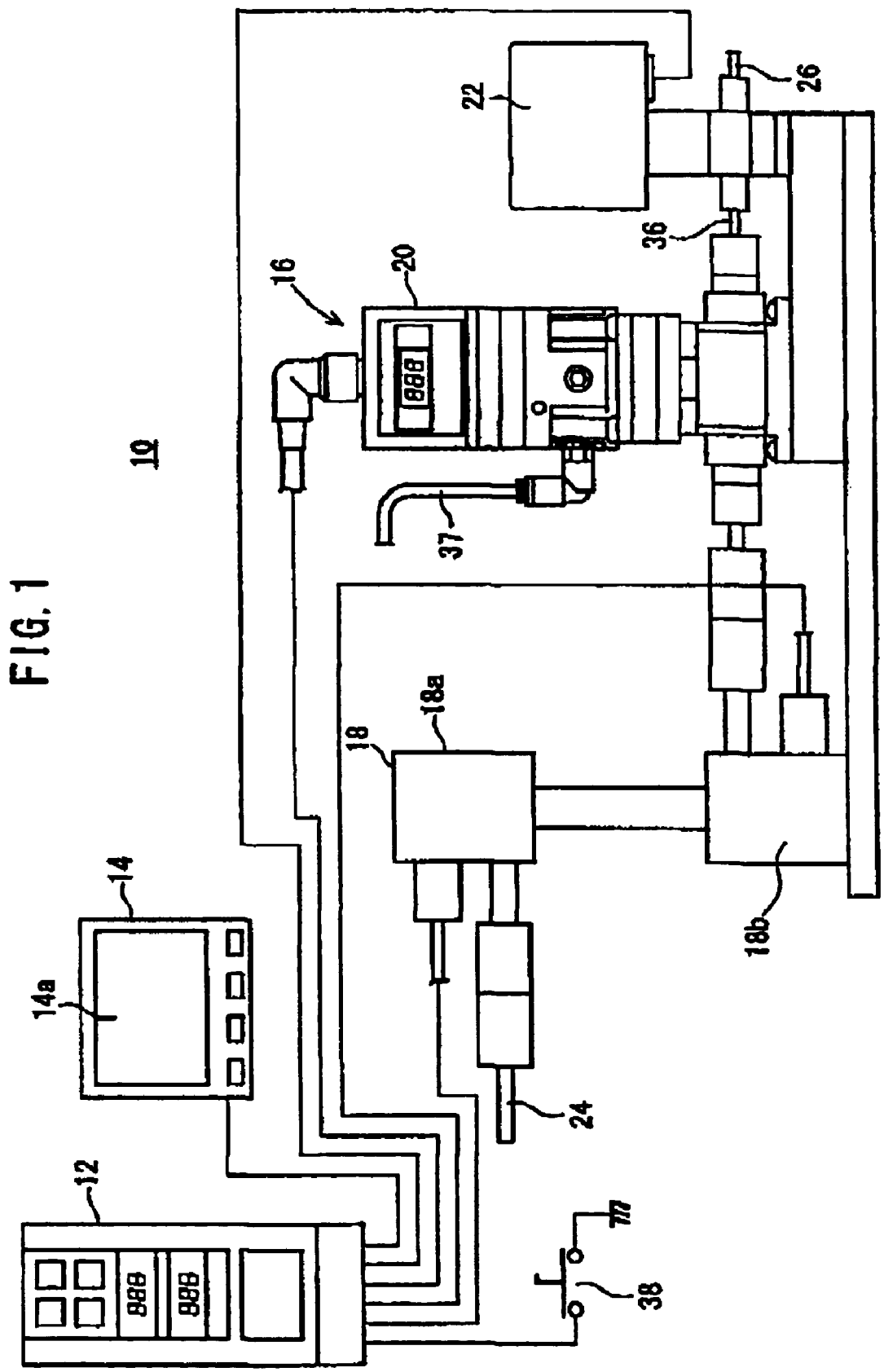
FIG. 1 is a partial schematic side view of a flow rate control device of the present invention.
Figure 2:
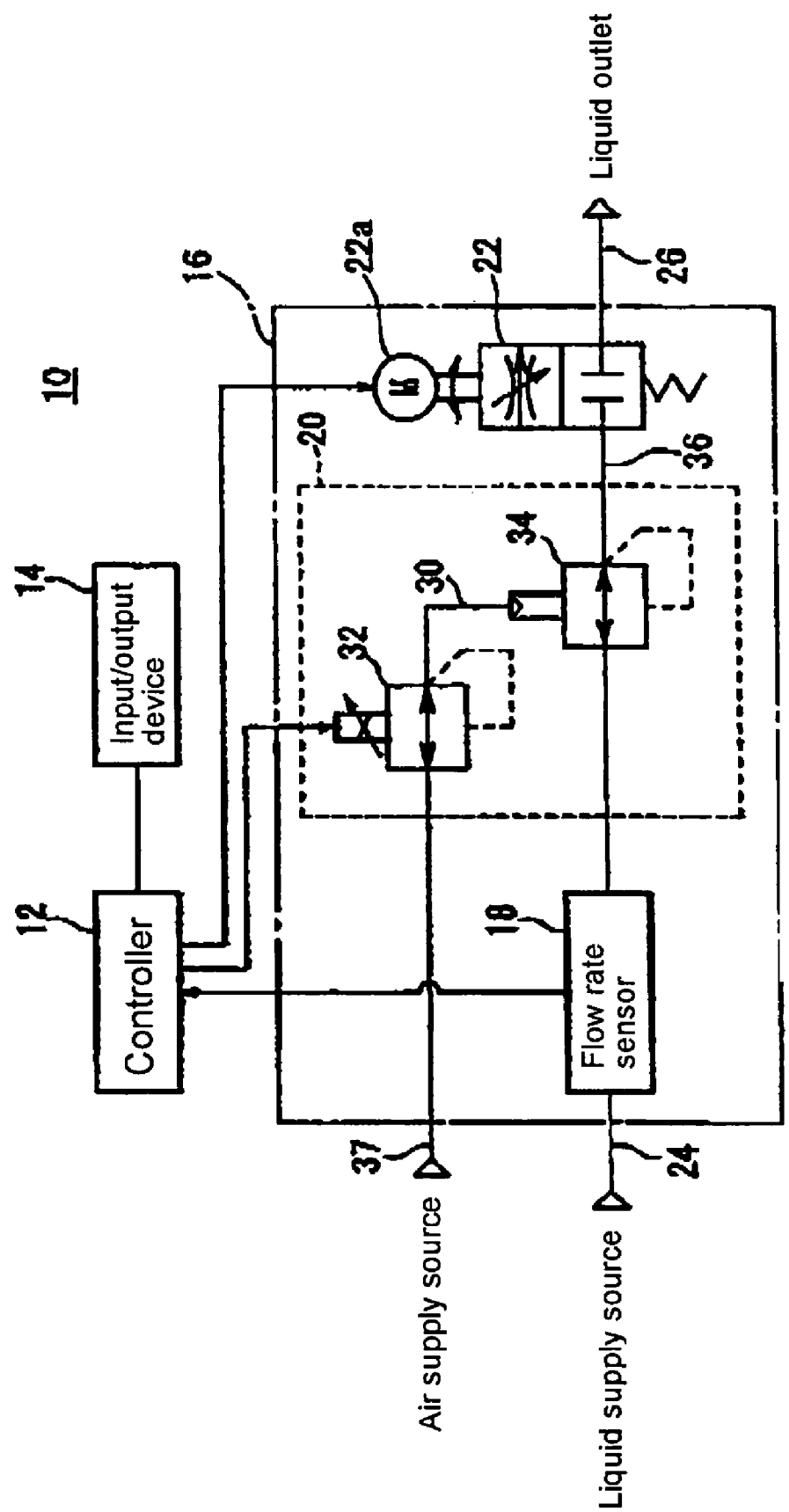
FIG. 2 is a block diagram of the flow rate control device of the present invention.

As shown in FIGS. 1 and 2, a flow rate control device 10 of the present invention includes a controller 12, an input/output device 14 connected to the controller 12, and a control device main body 16. The input/output device 14 has a monitor screen 14a as a display portion.

The control device main body 16 includes a flow rate sensor 18 for measuring a flow rate of a passing liquid, a regulator 20 for reducing a pressure of the liquid which has passed through the flow rate sensor 18, and a flow rate adjustment valve 22 for adjusting the flow rate of the liquid supplied from the regulator 20 by changing a valve opening of its valve. The liquid whose flow is controlled by the flow rate control device 10 is supplied from a pump (not shown) to an inlet pipe 24, and outputted from an outlet pipe 26 through the regulator 20 and the flow rate adjustment valve 22. The liquid supplied to the flow rate control device 10 is, e.g., a chemical liquid and pure water.

The flow rate sensor 18, which is an ultrasonic type sensor, can detect a flow rate in accordance with a time difference between interactive ultrasonic pulse transmissions by two transmitting/receiving portions 18a and 18b. The flow rate sensor 18 detects the flow rate in succession every micro time, and provides the obtained detection value to the controller 12. A paddle type flow rate sensor, a thermal type flow rate sensor, a float type flow rate sensor, etc. may be used as the flow rate sensor 18.

The regulator 20 includes an electropneumatic regulator 32 and an air operated valve 34. The electropneumatic regulator 32 adjusts an air pressure of a pilot vessel 30 in accordance with an regulator controlled degree instruction value, which value is supplied from the controller 12. The air operated valve 34 adjusts a pressure of a liquid at a connecting portion 36 by use of the air pressure of the pilot vessel 30.

A relatively-high pressured air is supplied from an air supply source such as a compressor to the electropneumatic regulator 32 via a vessel 37. The relatively-high pressured air is decompressed in accordance with the regulator controlled degree instruction value, and then outputted to the pilot vessel 30. An interface circuit including, e.g., an amplifier function is provided in the electropneumatic regulator 32. The regulator controlled degree instruction value functions via this interface circuit. The liquid which has passed through the flow rate sensor 18 is supplied to the air operated valve 34, decompressed in accordance with the air pressure of the pilot vessel 30, and outputted to the connecting portion 36. The air operated valve 34 preferably employs, e.g., a diaphragm type valve. The regulator 20 can rapidly set a pressure of the connecting portion 36 because of its sufficiently-rapid response. Therefore, even when a pressure change occurs (due to, e.g., pulsation of a piston), influence on a pressure value of the connecting portion 36 is very small.

The regulator 20 may employ, e.g., a motor-driven type and an electromagnetic solenoid type in addition to the air pressure pilot type.

The flow rate adjustment valve 22 is a motor-driven type throttle valve, which can change its valve opening. A motor 22a, which is an actuator of the flow rate adjustment valve 22, is a stepping motor. The motor 22a also may be, e.g., an AC motor. The motor 22a can have relatively-low accuracy.

Additionally, the flow rate adjustment valve 22 may be any one which changes its valve opening. For example, solenoid-driven type and spool type adjustment valves may be used.

The controller 12 is connected to the flow rate sensor 18 and reads a flow rate of a liquid from the flow rate sensor 18. Additionally, the controller 12 is connected to the regulator 20 and the flow rate adjustment valve 22. The controller 12 transmits, to the regulator 20, a voltage signal or a current signal as the regulator controlled degree instruction value, and transmits, to the flow rate adjustment valve 22, a series of pulse signals as an instruction value. Further, the controller 12 is connected to an alternate type switch 38. By operating the switch 38, the flow rate control device 10 can be operated and stopped. The input/output device 14, the flow rate sensor 18, the regulator 20, the flow rate adjustment valve 22, and the switch 38 are connected to the controller 12 via compact connectors, and can be disassembled by attaching/detaching the compact connectors.

Figure 4:
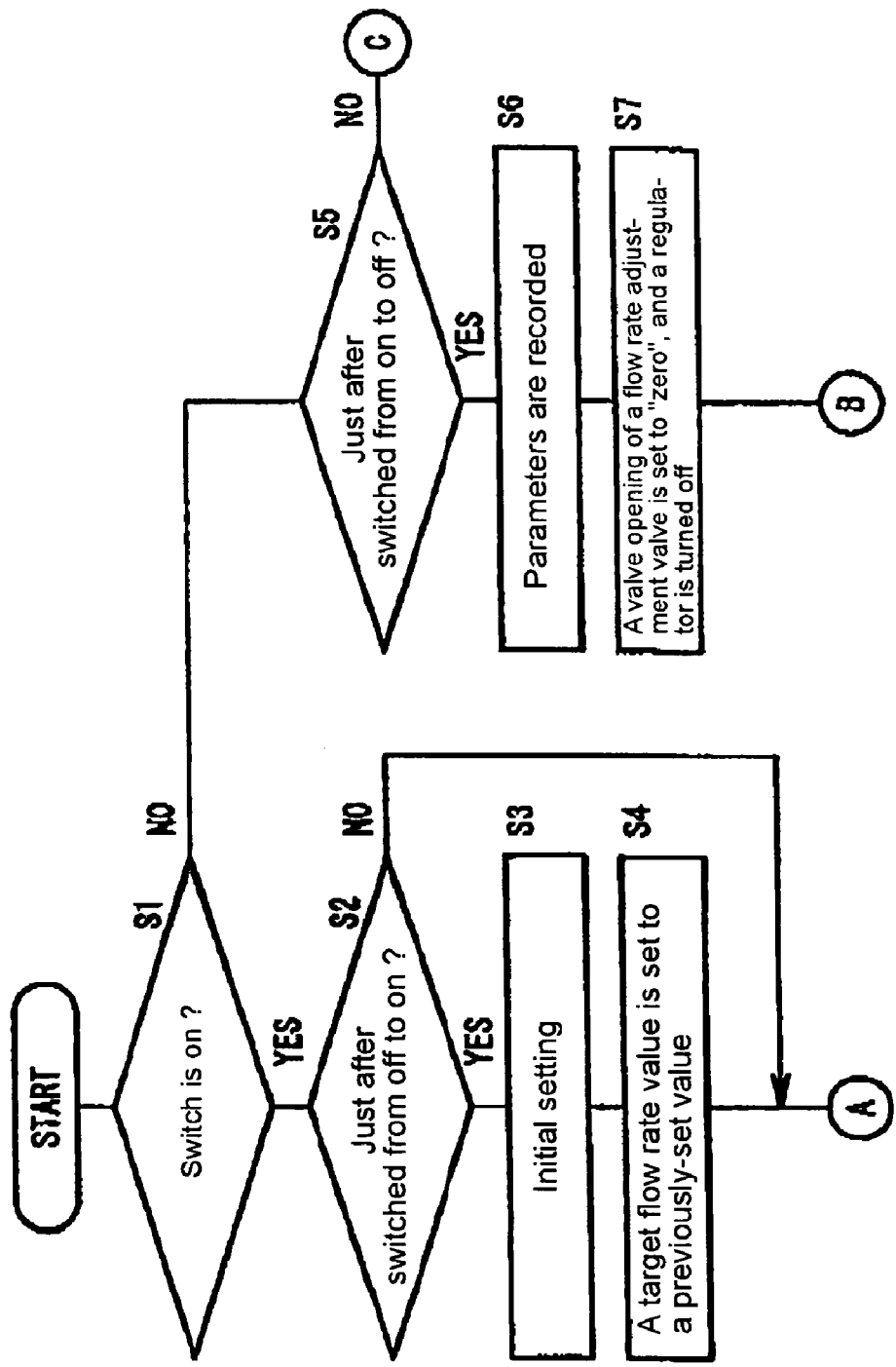
FIG. 4 is a flowchart (No. 1) of a program executed by a controller.
Figure 5:
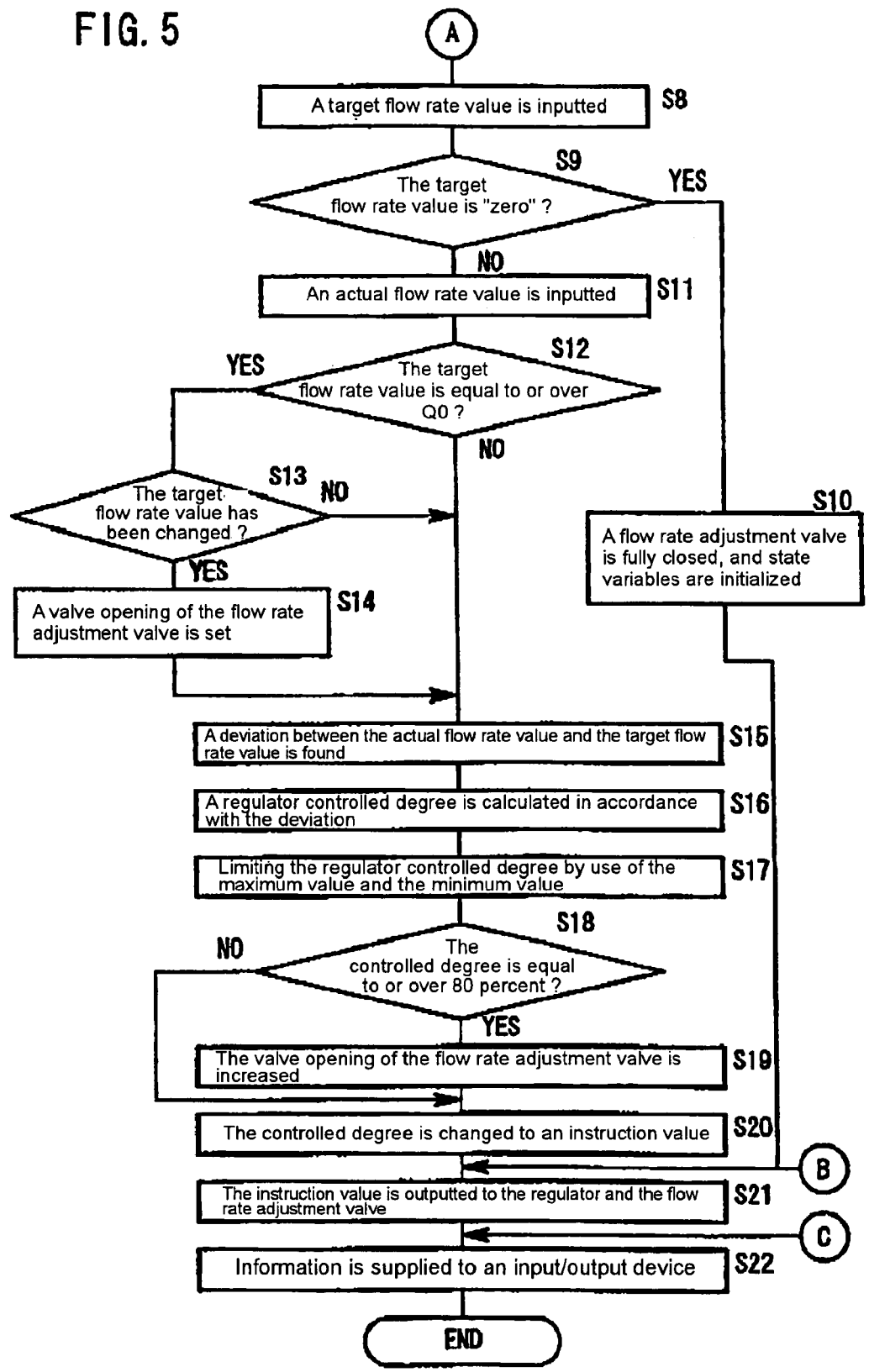
FIG. 5 is a flowchart (No. 2) of a program executed by the controller.

Next, a process that the flow rate control device 10 structured as described above controls a flow rate of a liquid is explained with reference to FIGS. 3 to 5.

Figure 3:
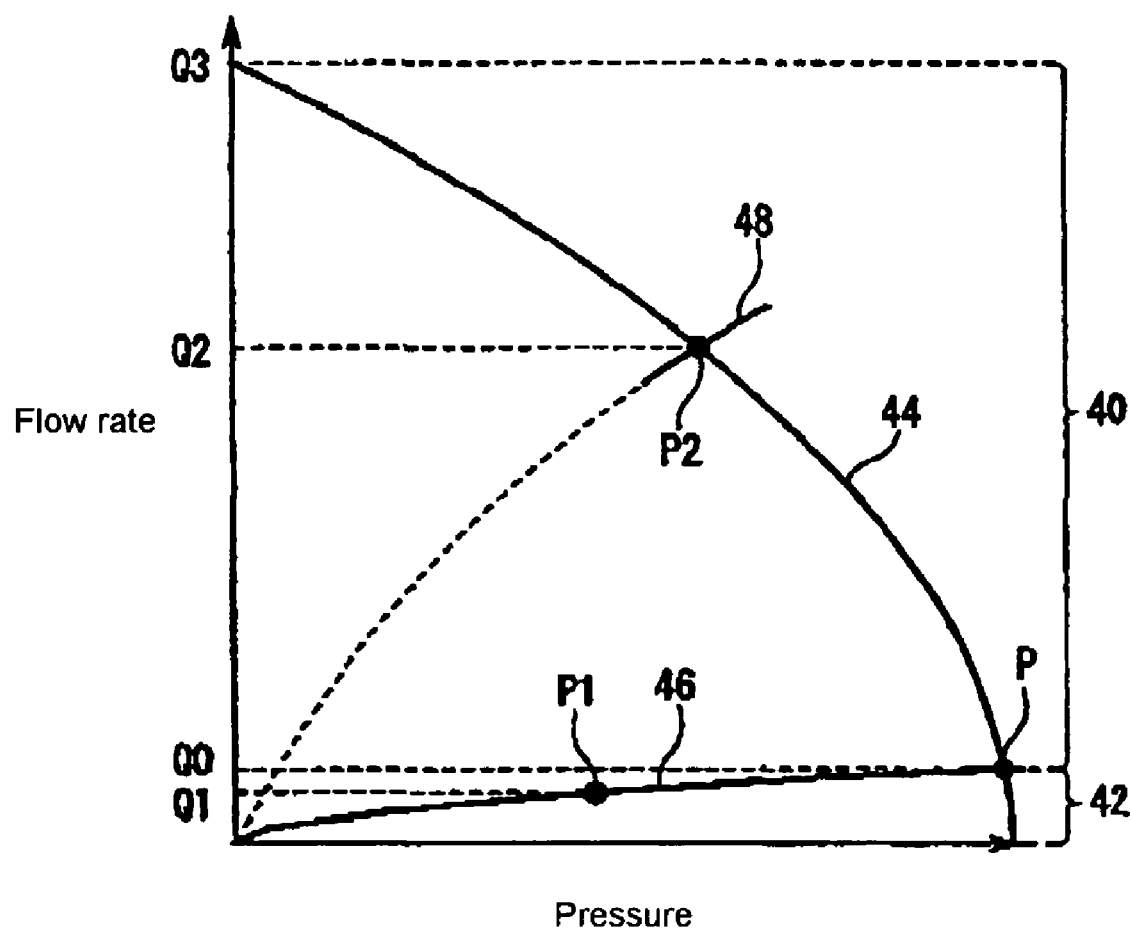
FIG. 3 is a diagram showing pressure/flow rate characteristics of liquid whose state is controlled by the flow rate control device.

First, before execution of a program of the controller 12, a control switching point P shown in FIG. 3 is set. This control switching point P is a boundary point between a high flow rate area 40 and an extremely-low flow rate area 42. The area 40 is controlled mainly by the regulator 20, and the area 42 is controlled mainly by the flow rate adjustment valve 22. The switching point P corresponds to a portion relatively lower than a maximum controlled degree of the regulator 20, and to an almost-minimum valve opening at which the flow rate adjustment valve 22 can control a flow rate with predetermined accuracy. In the following embodiment, a regulator controlled degree (threshold) corresponding to the control switching point P is 80 percent.

Figure 9:
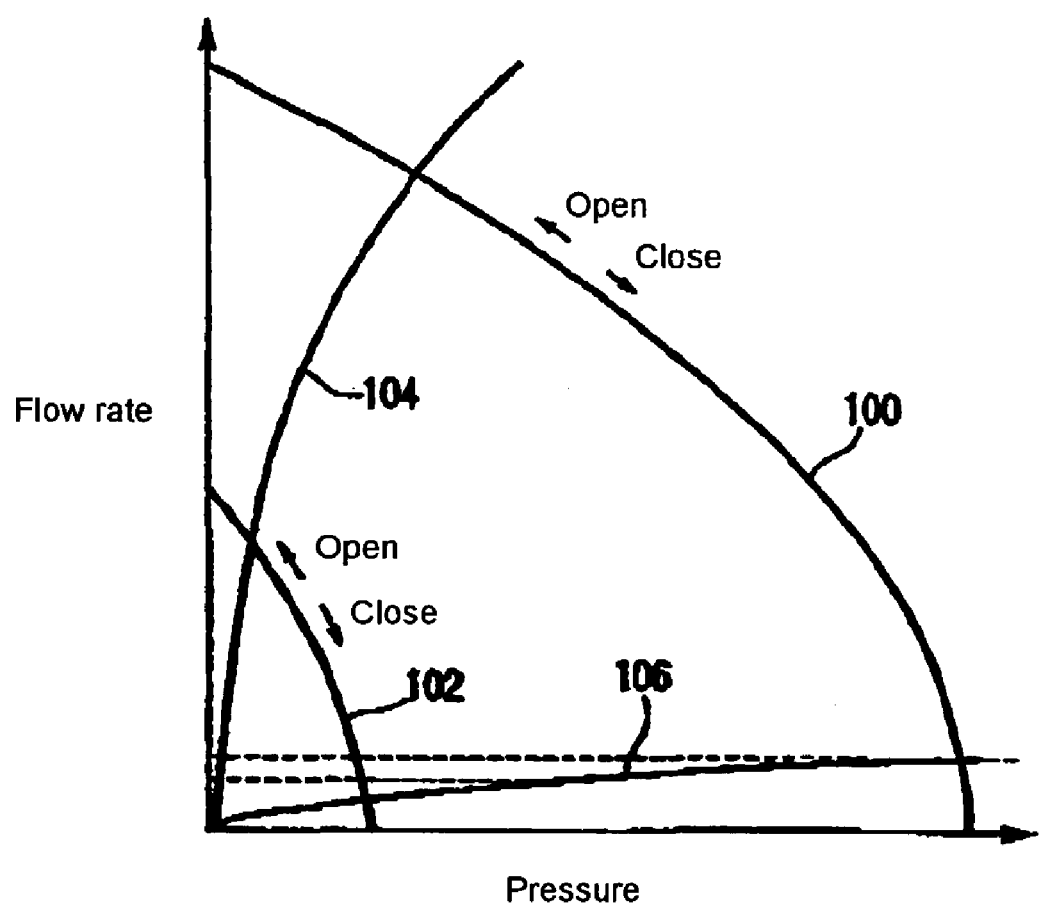
FIG. 9 is a diagram showing pressure/flow rate characteristics of liquid in a conventional flow rate control device.

In the area 40, a curved line 44 representing a relationship between a pressure and flow rate of a liquid corresponds to the above-described curved line 100 (see FIG. 9). In the area 42, a curved line 46 representing a relationship between a pressure and flow rate of liquid corresponds to the above-described curved line 106 (see FIG. 9).

As described above, by setting the control switching point P, a flow rate in the area 40 can be accurately controlled mainly by the flow rate adjustment valve 22, and a flow rate in the area 42 can be accurately controlled mainly by the regulator 20.

Additionally, because the control switching point P is set to a point corresponding to a portion relatively lower than the maximum controlled degree of the regulator 20, an adjustable range of a pressure of the regulator 20 can be fully used and overshot in some degree, achieving an adequate control of the flow rate.

A regulator controlled degree (80 percent of the maximum controlled degree) corresponding to the control switching point P and a flow rate Q0 corresponding to the control switching point P are recorded in a predetermined recording portion.

Next, a process for an instruction of a switch 38 is explained with reference to FIG. 4. Processes of flowcharts shown in FIGS. 4 and 5 are executed mainly by a program of the controller 12, and repeated in succession every predetermined short time.

First, in step S1, it is determined whether the switch 38 is on or off. When the switch 38 is on, the process moves to step S2, and when the switch 38 is off, the process moves to step S5.

In step S2, it is determined whether the switch 38 has just switched from off to on. In other words, when the switch 38 was off in the most recent process, it is judged that the switch 38 has just switched from off to on. When the switch 38 has just switched from off to on, the process moves to step S3, and otherwise, the process moves to step S8.

In step S3, an initial setting is executed for the flow rate control device 10. In other words, the state variables when the switch 38 has switched to off in the most recent process are loaded to set the variables as predetermined parameters. This state variables have been recorded in a predetermined recording portion in the after-mentioned step S6. In this initial setting, a valve opening of the flow rate adjustment valve 22 is fully closed.

Next, in step S4, a target flow rate value is set to a previously-set value. After that, the process moves to step S8.

In step S5, where the switch 38 is off, it is determined whether the switch 38 has just switched from on to off. In other words, when the switch 38 was on in the most recent process, it is judged that the switch 38 has just switched from on to off. When the switch 38 has just switched from on to off, the process moves to step S6, and otherwise, the process moves to step S22.

In step S6, the current parameter values are recorded as state variables in the predetermined recording portion.

Next, in step S7, a valve opening of the flow rate adjustment valve 22 is set to "zero" (fully closed), and the regulator 20 is set off, and then the process moves to step S21. By setting the regulator 22 to off, a pressure of the downstream, in other words, of the connecting portion 36 becomes zero. After that, the process moves to S21.

In such a manner, by recording or loading the state variables in accordance with a state of the switch 38 thorough the processes in steps S1 to S7, the parameters need not to be set every time. When the switch 38 becomes off, both the regulator 20 and the flow rate adjustment valve 22 are stopped, stopping a flow of a liquid.

Next, a main process portion, which controls the regulator 20, the flow rate adjustment valve 22, and the input/output device 14, is explained with reference to FIG. 5.

First, in step S8, a target flow rate value is inputted from an external device such as the input/output device 14.

Next, in step S9, it is determined whether the target flow rate value is "zero". When the target flow rate value is "zero", the process moves to step S10, and when the target flow rate value is not "zero", the process moves to step S11.

In step S10, a valve opening controlled degree is set so that a valve opening of the flow rate adjustment valve 22 is "zero", and the regulator 22 is set off. The state variables are initialized, and the process moves to step S21. By setting the valve opening of the flow rate adjustment valve 22 to "zero", the interface (not shown) of the controller 12 transmits a series of pulses to the flow rate adjustment valve 22 so that the valve of the flow rate adjustment valve 22 is closed. At this time, the number of the series of the pulses is set rather great so that the flow rate adjustment valve 22 is certainly closed.

In step S11, an actual flow rate value is inputted from the flow rate sensor 18.

Next, in step S12, it is determined whether a target flow rate value is equal to or over a flow rate Q0 (see FIG. 3). When the target flow rate value is equal to or over the flow rate Q0, the process moves to step S13, and when target flow rate value is under the flow rate Q0, the process moves to step S15.

In step S13, it is determined whether the target flow rate value has been changed. In other words, it is determined whether the target flow rate value in the most recent process is the same as that in the current process. When the target flow rate values are different, the process moves to step S14, and when the target flow rate values are the same, the process moves to step S15.

In step S14, a valve opening controlled degree is set so that a valve opening of the flow rate adjustment valve 22 corresponds to the target flow rate value. The valve opening controlled degree, which corresponds to the target flow rate value, is found by a calculation and with reference to a predetermined map, and outputted to the flow rate adjustment valve 22 to achieve this valve opening. After that, the process moves to step S15.

Next, in step S15, a deviation between the actual flow rate value provided from the flow rate sensor 18 and the target flow rate value is found. In the following steps, processes are executed in accordance with this deviation, and the actual flow rate value functions as a feedback. The process in step S15 functions as a subtraction point in a general control system.

Next, in step S16, a regulator controlled degree is found in accordance with the deviation. The regulator controlled degree is found by, e.g., a PID process.

Next, in step S17, the regulator controlled degree is revised to be within an adequate range. In other words, the regulator controlled degree is limited by the minimum and maximum values to be within an input range of the regulator 20, so that it becomes a value in the range of zero to 100 percent.

Next, in step S18, it is determined whether the regulator controlled degree is equal to or over 80 percent of the maximum controlled degree. When the regulator controlled degree is equal to or over 80 percent of the maximum controlled degree, the process moves to step S19. When the regulator controlled degree is under 80 percent of the maximum controlled degree, the process moves to step S20. The threshold of 80 percent has been recorded in the above-described recording portion.

In step S19, a valve opening controlled degree is found so that a valve opening degree of the flow rate adjustment 22 is increased compared to its current valve opening degree, and the process moves to S20.

Next, in step S20, the regulator controlled degree is transferred to a regulator controlled degree instruction value, which conforms with an instruction value input specification of the regulator 20. Concretely, the regulator controlled degree is transferred to a value corresponding to a voltage of 1 to 5 V or a value corresponding to a current of 20 to 40 mA.

Next, in step S21, a regulator controlled degree instruction value is supplied as a signal of, e.g., a voltage and a current to the regulator 20. An instruction value based on the valve opening controlled degree is outputted as a series of pulses to the flow rate adjustment valve 22.

Next, in step S22, information is provided to the input/output device 14. This information is, e.g., an actual flow rate value obtained from the flow rate sensor 18, a regulator controlled degree, a valve opening controlled degree of the flow rate adjustment valve 22, and various alarm signals. The actual flow rate value is preferably always displayed on the monitor screen 14a of the input/output device 14. The regulator controlled degree and the valve opening controlled degree of the flow rate adjustment valve 22 are preferably displayed for maintenance, if necessary. The alarm signals are preferably displayed when abnormality occurs.

After providing the information to the input/output device 14, this process ends.

Next, relationship between a flow rate and pressure of a fluid controlled by the flow rate control device 10 is explained with reference to FIGS. 3 and 5.

When the flow rate Q1 lower than the flow rate Q0 corresponding to the control switching point P is the target flow rate value, the flow rate adjustment valve 22 is fully closed in the initial state. As a result, the regulator controlled degree instantaneously becomes 100 percent. At this time, neither steps S13 nor S14 are executed.

After that, steps S18 and S19 are executed, so that the valve opening of the flow rate adjustment valve 22 is gradually increased, and then reaches the valve opening corresponding to the control switching point P. The increase of the valve opening causes a liquid to flow, so that the deviation found in step S15 becomes relatively small. As a result, the regulator controlled degree becomes 80 percent, and state of a pressure and flow rate of a liquid at the connecting portion becomes the control switching point P. Further, because the flow rate Q1 of the target flow rate value is smaller than the flow rate Q0, the regulator controlled degree is decreased, moves along the curved line 46, and reaches a point P1 of the flow rate Q1. Because the curved line 46 is gently inclined, the flow rate slightly changes in response to a change of the regulator controlled degree, and thus the flow rate can be accurately set.

Next, when the flow rate Q2, which is greater than the flow rate Q0 corresponding to the control switching point P, is the target flow rate, steps S13 and S14 are executed, so that a valve opening controlled degree of the flow rate adjustment valve 22 is set, and the regulator controlled degree becomes 80 percent to reach a point P2 corresponding to a flow rate Q2. After that, steps S13 and S14 are executed, so that the regulator controlled degree changes to permit a fine adjustment. In other words, the regulator 20 adjusts a pressure of the connecting portion 36, so that a state of liquid changes along a small curved line 48 to finely adjust a flow rate.

In such a manner, it is possible to set a flow rate in the wide range from the flow rate Q0 to the maximum flow rate Q3 along the curved line 44. Further, the flow rate is finely adjusted along the small curved line 48, and thereby can be accurately controlled. Additionally, because the fine adjustment can be executed by the regulator 20, the flow rate adjustment valve 22 is permitted to have relatively-low accuracy. Therefore, a low-cost flow rate adjustment valve can be used.

The flow rate in the area 40 may be finely adjusted by increasing/decreasing the valve opening of the flow rate adjustment valve 22 without using the regulator 20. For example, because the curved line 44 is gently inclined near the maximum flow rate Q3, the flow rate can be relatively accurately set also by changing the opening of the flow rate adjustment valve 22.

As described above, according to the flow rate control device 10, the regulator 20 and flow rate adjustment valve 22 connected in series to one another can cooperatively control a flow rate ranging from an extremely-low rate to a high rate, particularly, control even an extremely-low flow rate accurately.

Additionally, because the flow rate sensor 18 is provided upstream of the regulator 20, it can measure the flow rate accurately without influence of bubbles generated in the regulator 20 and flow rate adjustment valve 22.

Further, because the regulator 20 adjusts the pressure at the connecting portion 36, disturbance such as pulsation of the pump supplying the fluid hardly influences the flow rate control.

Next, the flow rate control device 10a, which is an alternative of the present invention, is explained with reference to FIGS. 6 to 8. In the flow rate control device 10a, the single controller 12 controls the control device main bodies 16a, 16b, and 26c, which separately control the flow rates. The same components of the flow rate control device 10a as the above-described flow rate control device 10 is given the same numerals and symbols as the flow rate control device 10, and not explained in detail.

The flow rate control device 10a includes the control device main bodies 16a, 16b and 16c, the controller 12 for controlling the control device main bodies 16a, 16b and 16c, and a mixing device 50 for mixing liquids whose flow rates controlled by the control device main bodies 16a, 16b and 16c. The control device main bodies 16a, 16b and 16c have the same structure as the above-described control device main body 16.

For example, pure water is supplied to the control device main body 16a, where the pure water is adjusted to have a relatively-high flow rate and supplied to the mixing device 50. For example, a first and second chemical liquids are supplied to the control device main bodies 16b and 16c, where the first and second chemical liquids are adjusted to have extremely-low flow rates and supplied to the mixing device 50. The mixing device 50 mixes the supplied pure water and the first and second chemical liquids, and then outputs the mixed liquid to other device.

Figure 7:
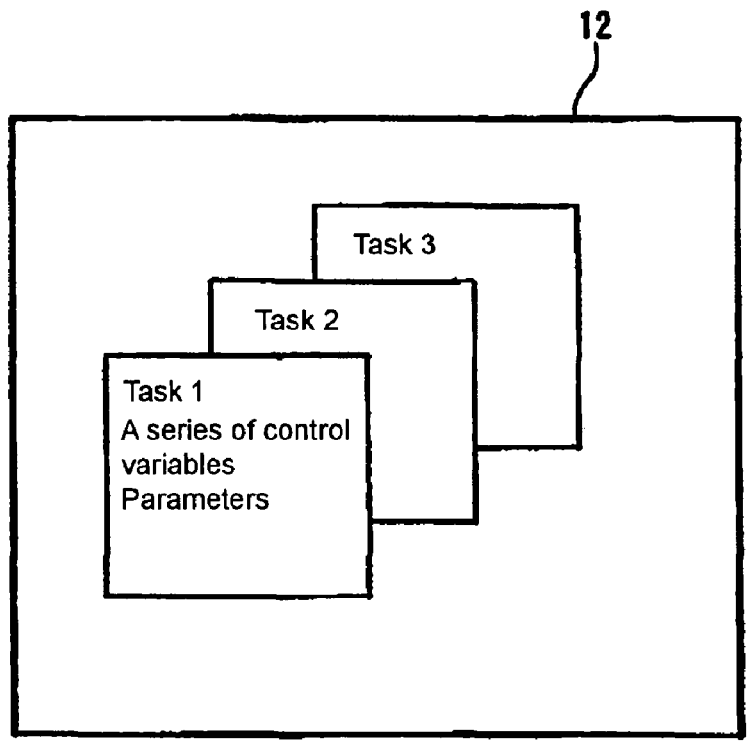
FIG. 7 is a diagram showing tasks of an alternative of the flow rate control device.
Figure 8:
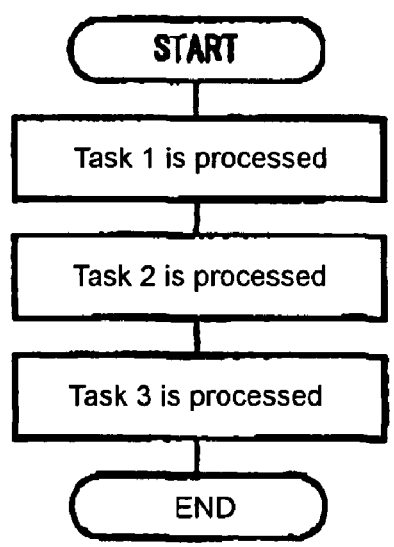
FIG. 8 is a flowchart showing a procedure for executing tasks of an alternative of the flow rate control device.

As shown in FIG. 7, tasks 1 to 3 respectively controlling the control device main bodies 16a, 16b, and 16c are recorded in the recording portion of the controller 12. Each task 1 to 3 includes a program, a series of control variables, and parameters. Each task 1 to 3 executes the same processes as the flowcharts shown in FIGS. 4 and 5. Concretely, as shown in FIG. 8, the tasks 1 to 3 are sequentially executed within an extremely-short time, and these execution are successively repeated. This means that these tasks are executed in the form of the so-called multitask. Therefore, the control device main bodies 16a, 16b, and 16c can be separately controlled in real time.

In this case, because the pure water has a high flow rate, it is controlled along the curved line 44 in the area 40 shown in FIG. 3. Because the first and second chemical liquids have extremely-low flow rates, they are controlled along the curved line 46 in the area 42 shown in FIG. 3.

In such a manner, according to the flow rate control device 10a, the single controller 12 can separately control flow rates of liquids passing through the three control device main bodies 16a to 16c. Additionally, a flow rate can be set to a range from a high rate to an extremely-low rate, and even an extremely-low flow rate can be controlled accurately.

Figure 6:
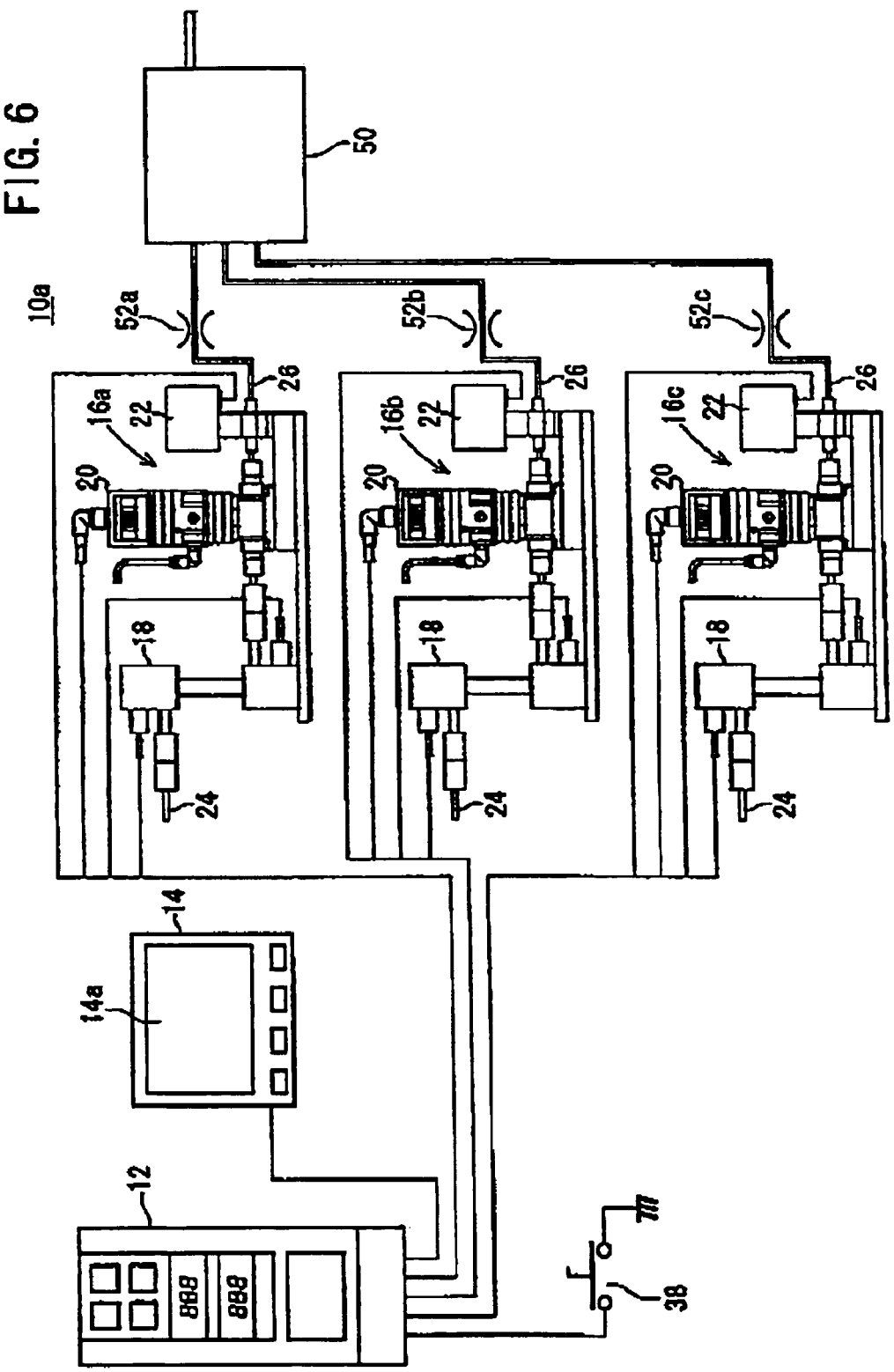
FIG. 6 is a partial schematic side view showing an alternative of the flow rate control device.

Further, flow rates of the pure water and the first and second chemical liquid flowing into the mixing device 50 are hardly influenced by the back pressure of the vessel resistances 52a, 52b, and 52c (see FIG. 6). In other words, in the control device main bodies 16a, 16b, and 16c, because the regulator 20, upstream of the flow rate adjustment valve 22, adjusts the pressure, a push of a high flow rate liquid does not cause the flow rate to be instable even when the target flow rate value is extremely-low flow rate. Therefore, the flow rate which is set as the target flow rate value can be certainly introduced into the mixing device 50, so that a concentration of the pure water to the first and second chemical liquids can be adequately set.

While the flow rate control device 10a uses the three control device main bodies 52a, 52b, and 52c, it is obvious that the number of the control device main bodies may be two or equal to or more than four.

In the above-described embodiments and alternative of the flow rate control devices 10 and 10a, the examples of the flow rates controlled along trajectories of the curved lines 44 and 46 (see FIG. 3) have been explained. The characteristics of the pressures and flow rates do not always need to be along these curved lines. Adequate trajectories can be set in accordance with, e.g., characteristics of liquids and with characteristics of devices supplied with the liquids.

The flow rate control device of the present invention can employ various structures not limited to the above-described embodiments without departing from the spirit of the present invention.

As described above, according to the flow rate control device of the present invention, a liquid flow can be controlled to a range from an extremely-low rate to a high rate. Particularly, a liquid having an extremely-low flow rate can be accurately controlled.

What is claimed is:

1. A flow rate control device comprising:
   a regulator for reducing a pressure of a supplied liquid;
   a flow rate adjustment valve for adjusting an opening degree of its valve provided to a passage, the flow rate adjustment valve being connected in series downstream of the regulator;
   a flow rate sensor for detecting a flow rate of the liquid; and
   a control portion for controlling the regulator by finding a regulator controlled degree in accordance with a detection value of the flow rate sensor and a target flow rate value, and for controlling the flow rate adjustment valve by finding a valve opening controlled degree of the flow rate adjustment valve.

2. The flow rate control device according to claim 1, wherein the regulator controlled degree is found so that a deviation between the detection value of the flow rate sensor and the target flow rate value becomes zero, and the valve opening degree is increased when the regulator controlled degree is over a predetermined threshold.

3. The flow rate control device according to claim 1, wherein, when the target flow rate value is greater than a flow rate corresponding to a predetermined control switching point, the valve opening is increased/decreased to control the flow rate while keeping a setting of the regulator almost constant, and wherein, when the target flow rate value is smaller than the flow rate corresponding to the predetermined control switching point, the regulator is operated to control the flow rate while keeping the valve opening almost constant.

4. The flow rate control device according to claim 1, wherein the flow rate sensor is provided upstream of the regulator.

* * * * *